Figure 1:
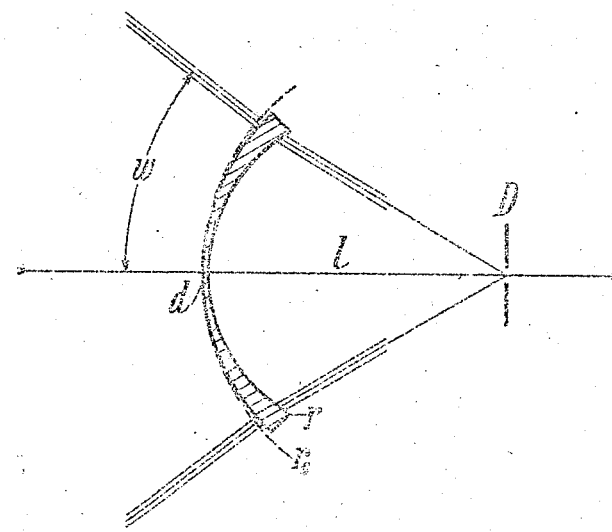

M. VON ROHR.
SPECTACLE GLASS.
APPLICATION FILED JUNE 5, 1909.

949,501.

Patented Feb. 15, 1910.

UNITED STATES PATENT OFFICE.

MORITZ VON ROHR, OF JENA, GERMANY, ASSIGNOR TO FIRM OF CARL ZEISS, OF JENA, GERMANY.

SPECTACLE-GLASS.

949,501. Specification of Letters Patent. Patented Feb. 15, 1910.

Application filed June 3, 1909. Serial No. 499,991.

*To all whom it may concern:*

Be it known that I, MORITZ VON ROHR, a citizen of the German Empire, and residing at Carl-Zeiss strasse, Jena, in the Grand Duchy of Saxe-Weimar, Germany, have invented a new and useful Spectacle-Glass, of which the following is a specification.

The invention relates to spectacle glasses, not only correcting glasses, which present to ametropes sharp images of distant or near objects—dispersive glasses for myopic and collective glasses for hypermetropic and for aphacic eyes—but also magnifying glasses, that is to say, such collective glasses, which are designed to enable emmetropes, which are already presbyopes, to obtain distinct vision at close range.

It is well known, that a correcting glass in the form of a meniscus, when its concave surface is turned toward the eye, presents from objects lying in the peripheral parts of the field of view a somewhat less defective image than a glass more or less symmetrical in form. This fact is also true as regards magnifying spectacles. Its explanation lies in that the pencils, which travel obliquely to the axis of the spectacle glass and produce in direct vision the image of the said peripheral objects, undergo, in refraction through the likewise peripheral part of the spectacle glass, a smaller total error, when the glass is meniscal than when it is more or less symmetrical. Moreover, it has been postulated, that a single one of the errors of oblique pencils should be eliminated as completely as possible by suitably choosing the median curvature of the meniscus. Since the oblique pencils, which have only a small aperture corresponding to the pupil of the eye, cross in the center of rotation of the eye, this point, which lies about 3 cm. behind the vertex of the concave surface, need only be regarded as the center of a narrow diaphragm, after a well known law of the dioptrics of the eye, particularly emphasized by Gullstrand. By this law the new problem of practical optics is reduced to one of known character. It is somewhat after this manner that correcting spectacle glasses free from astigmatism have been calculated, for instance, by Ostwalt.

According to patent specification 697,959, the reduction of the errors of oblique pencils in dioptric systems having the diaphragm a larger or smaller distance away from one or several surfaces of the system, may be accomplished by deforming one or several of the spherical surfaces having some distance from the diaphragm, such deformation, in the technical sense of the word, consisting in varying the curvature continuously from the vertex to the margin, while retaining the property of the surface to be altered as a surface of revolution with reference to the axis of the system. The region of application of this means for correcting the errors of oblique pencils consists—according to the specification cited—of systems of composite character, namely, oculars and photographic objectives.

The present invention has arisen on the one hand by applying the means of correction according to patent specification 697,959 to the case of a spectacle glass as a single lens with a small hinder diaphragm, the distance of which is invariable and in addition thereto, extraordinarily large, on the other hand, however, through combining this means with the previously practiced alteration of the median curvature of the meniscus.

The object of the invention is the correction, no longer of one single error of oblique pencils, but of two. Each of the two means of correction stated acts on the one as well as on the other of the two errors, which are intended to be corrected. Correction for two errors is found to be even feasible, when a single surface only is deformed, provided that this is done not in the same measure, but in the same sense, as if the problem were to remove, in a pencil the rays of which are parallel to the axis and the diameter of which is that of the lens, the spherical aberration by a so-called aplanatic surface, which, as is well known, deviates from the spherical surface corresponding to its vertex in such a manner, that its curvature from the vertex to the margin approaches continuously to the degree of curvature of the second surface, which is left spherical. Such deformation makes a dispersive spectacle glass thinner, a collective one thicker at the margin. Since, however, in the second case the practically requisite small thickness of the margin need not be overstepped, but from the very first a correspondingly smaller thickness at the vertex can be proceeded from, a reduction in the weight of the spectacle glass is in the first case directly, in the second case indirectly, consequent upon the deformation.

The most favorable median curvature deviates considerably from those median curvatures, which afford, in a spectacle glass having the same number of dioptries and belonging to the same type (according to the differentiation in the first sentence of this specification) but being in no surface deformed, the best correction of one or the other of the same two errors of oblique pencils. All variations of the most favorable median curvature, according to the type of the spectacle glass and to its number of dioptries, are so limited, that neither the vertex radius of the deformed surface nor the radius of the spherical surface is shorter than $\frac{1}{5}$ of the focal length of the spectacle glass and one at most of the two radii exceeds $\frac{1}{3}$ of the said length. When astigmatism and distortion are chosen as the two errors to be removed as much as possible, an exhaustive investigation shows, that the more perfect correction is to be obtained, when the weaker curved surface is deformed.

Figure 2:
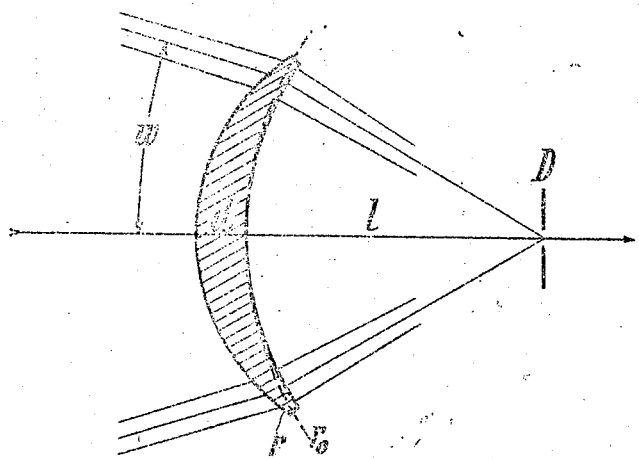

In the annexed drawing: Figure 1 is a diagram of a dispersive spectacle glass correcting a myopic eye for distance, this glass being corrected according to the invention. Fig. 2 is a diagram of a collective spectacle glass correcting a strongly hypermetropic or an aphacic eye for reading, this glass being corrected according to the invention.

The dispersive meniscus according to Fig. 1 consists of glass of the refractive index 1.52. It has 100 mm. focal length, its power is therefore 10 dioptries. Besides the assumption of great distance of the objects, there has been supposed a narrow hinder diaphragm D; the distance $l$ of which from the vertex of the hinder surface amounts to 30 mm. The radius $r$ of the hinder surface is 15.8 mm. The thickness $d$ at the vertex is 0.5 mm. The front surface is weakly deformed. Its vertex radius $r_o$, being at the same time the radius of the spherical surface, which corresponds to the vertex, and, having no reality, is drawn only in dots, amounts to 23.0 mm. From this spherical surface the margin of the deformed surface, having 32 mm. diameter, is only $\frac{1}{4}$ mm. distant. To what degree correction for astigmatism and distortion is attained, can be seen from the following table. It contains for several obliquities $w$ of the entering pencil: firstly, with regard to astigmatic correction, the intersectional distances $s'_s$ of the sagittal and $s'_t$ of the meridional component of the emerging pencil, that is to say, the distances from the place of exit to the places of intersection, and secondly, with regard to the correction for distortion, which without the employment of deformation is strongly barrel-shaped, the so-called ratio of magnification V, in this case the ratio between the angular distance of the object point and the linear distance of the image point from the optical axis.

| $w$ | 0° | 26°.265 | 37°.201 |
|---|---|---|---|
| $s'_s$ | 99.26 mm. | 100.29 mm. | 101.82 mm. |
| $s'_t$ | 99.26 " | 97.88 " | 102.73 " |
| V | 100 " | 99.01 " | 98.31 " |

The collective meniscus according to Fig. 2 is made from glass of the refractive index 1.655. Its focal length amounts to 72.59 mm., its power is consequently 13.8 dioptries. It is supposed, that the object lies in a plane which stands at right angles to the axis and is 330 mm. distant from the vertex of the front surface, and that a narrow diaphragm D lies at a distance $l = 30$ mm. behind the vertex of the hinder surface. The radius $r$ of the front surface is 21.30 mm. The thickness at the vertex is 5.0 mm. The hinder surface is deformed. The radius $r_o$ of the spherical surface corresponding to the vertex of the hinder surface is 35.0 mm. The margin of the deformed surface, having a diameter of 34 mm., lies at a distance of $\frac{1}{4}$ mm. from the said imaginary spherical surface. The following table contains the dimensions explained in the first example. V, however, here means the ratio between two lengths and can therefore be given in percentage. Distortion would without the employment of deformation be cushion-shaped to a very high degree.

| $w$ | 0° | 10°.596 | 16°.123 |
|---|---|---|---|
| $s'_s$ | 86.66 mm. | 88.27 mm. | 91.36 mm. |
| $s'_t$ | 86.66 " | 87.19 " | 93.78 " |
| V | 100% | 100.57% | 100.56% |

I claim:

1. A spectacle glass forming a meniscus and having two errors of oblique pencils corrected for a small diaphragm located behind it at the distance of about 3 cm., one of the two refracting surfaces being deformed, so that its curvature from the vertex to the margin continuously approaches the degree of curvature of the other surface, neither the vertex radius of the deformed surface nor the radius of the spherical surface being shorter than $\frac{1}{5}$ of the focal length of the spectacle glass and one at most of the two radii exceeding $\frac{1}{3}$ of the said length.

2. A spectacle glass forming a meniscus and having astigmatism as well as distortion corrected for a small diaphragm located behind it at the distance of about 3 cm., that of the two refracting surfaces, which has the weaker curvature being deformed, so that its curvature from the vertex to the margin continuously approaches the degree of curvature of the other surface, neither the vertex radius of the deformed surface nor the radius of the spherical surface being shorter than $\frac{1}{8}$ of the focal length of the spectacle glass and one at most of the two radii exceeding $\frac{1}{3}$ of the said length.

MORITZ VON ROHR.

Witnesses:
PAUL KRÜGER,
FRITZ LANDER.